March 13, 1945. R. E. COSTA 2,371,128
ARTICLE HANDLING AND LEAKAGE TESTING APPARATUS
Filed Feb. 4, 1942  6 Sheets-Sheet 2
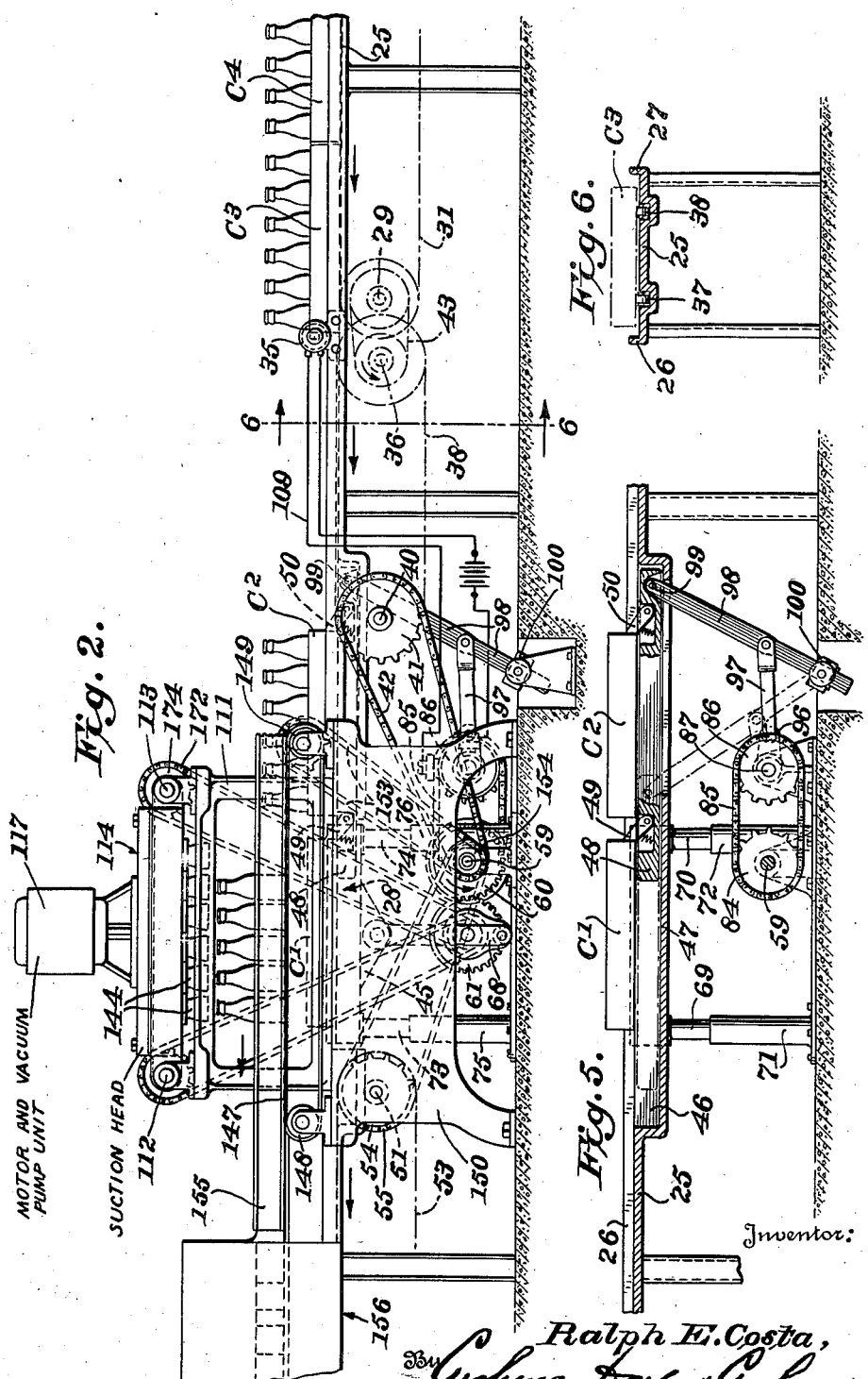

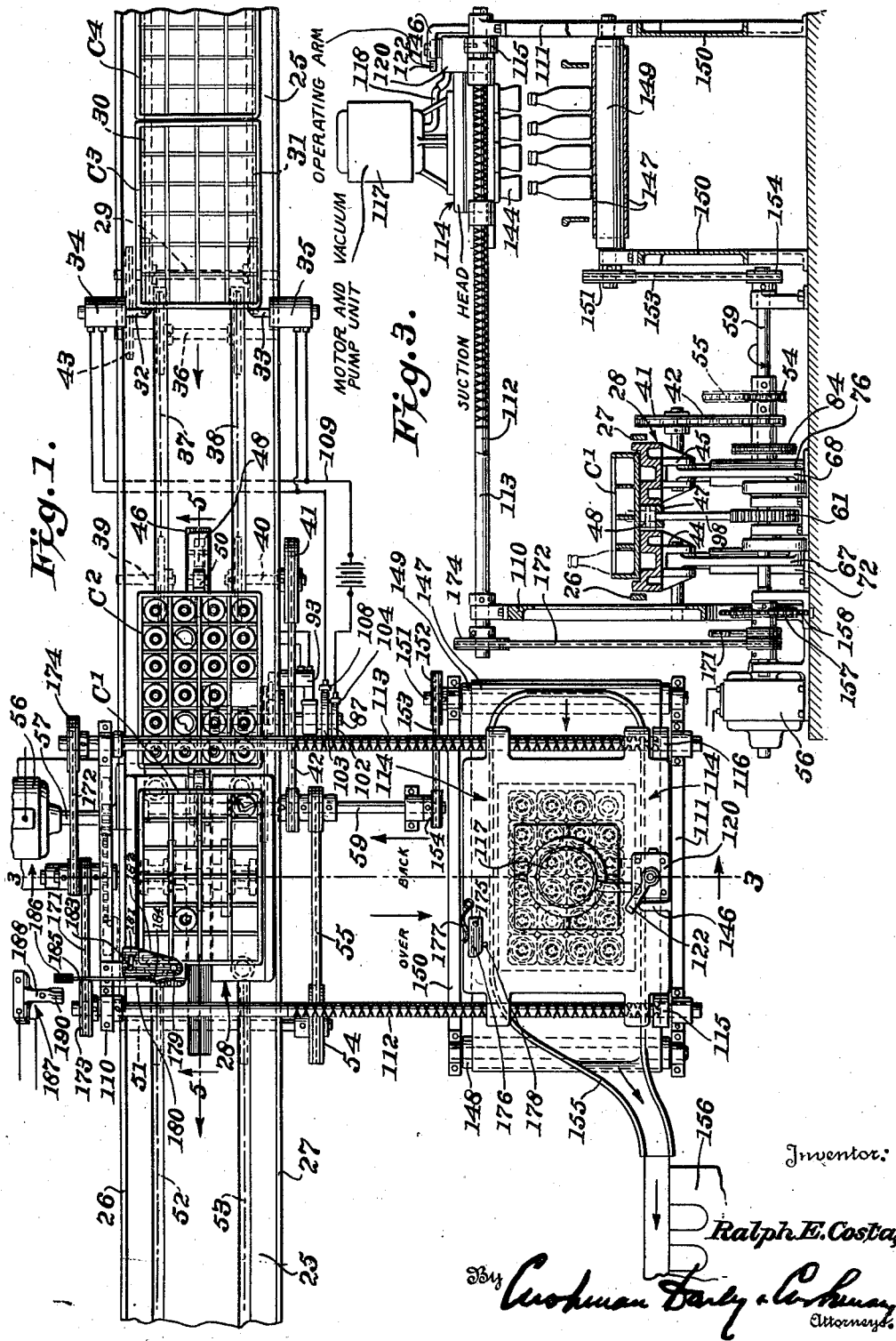

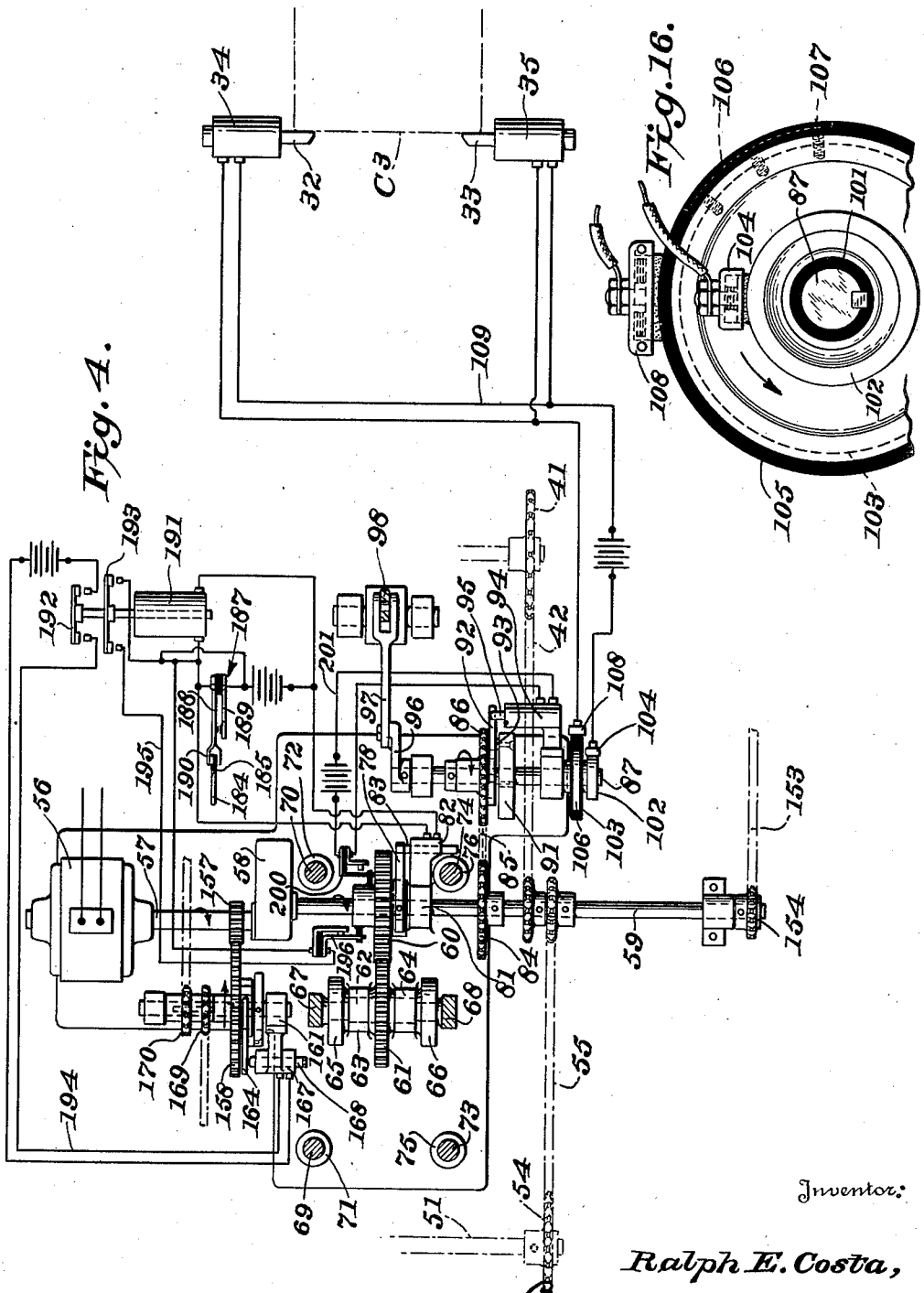

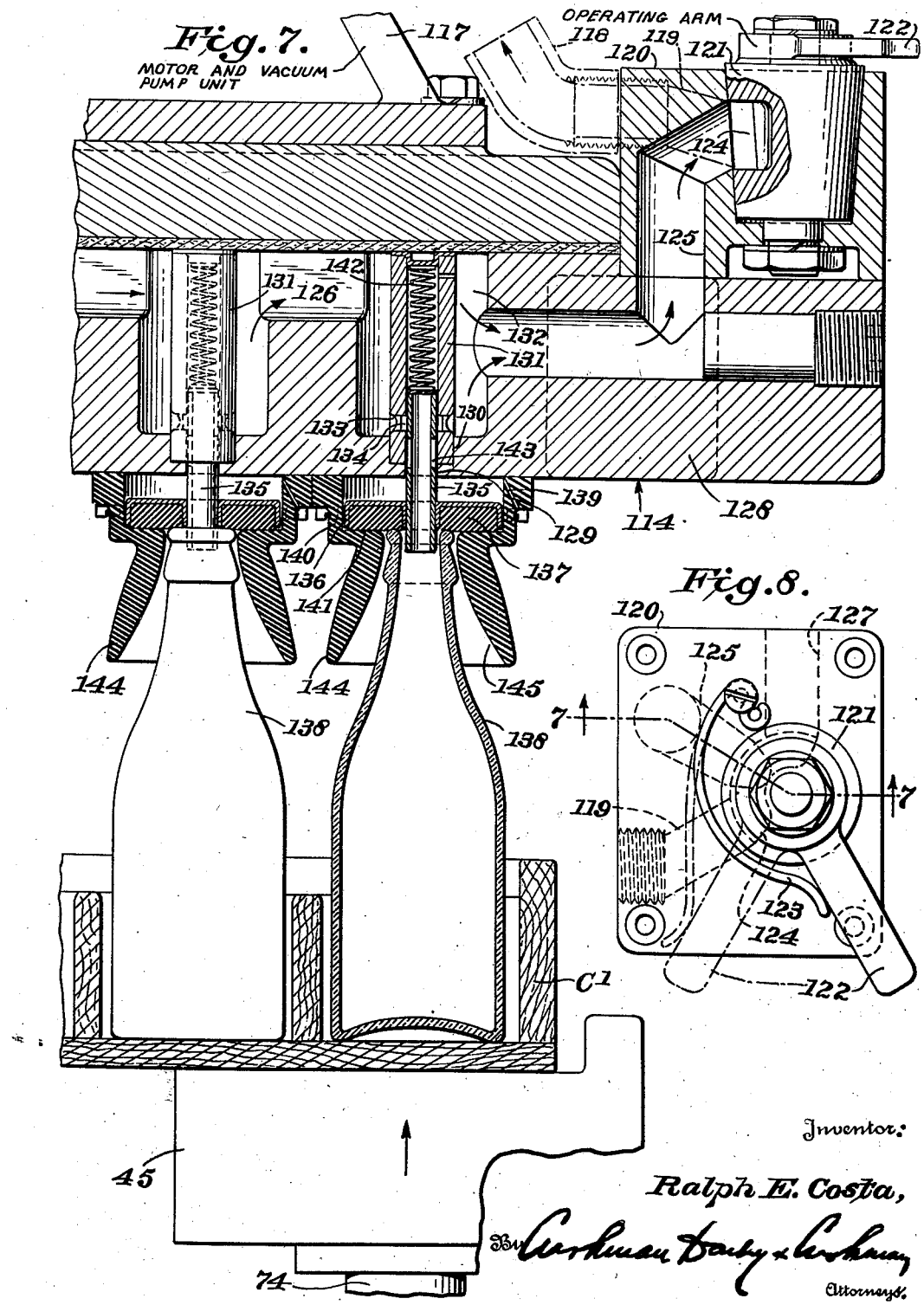

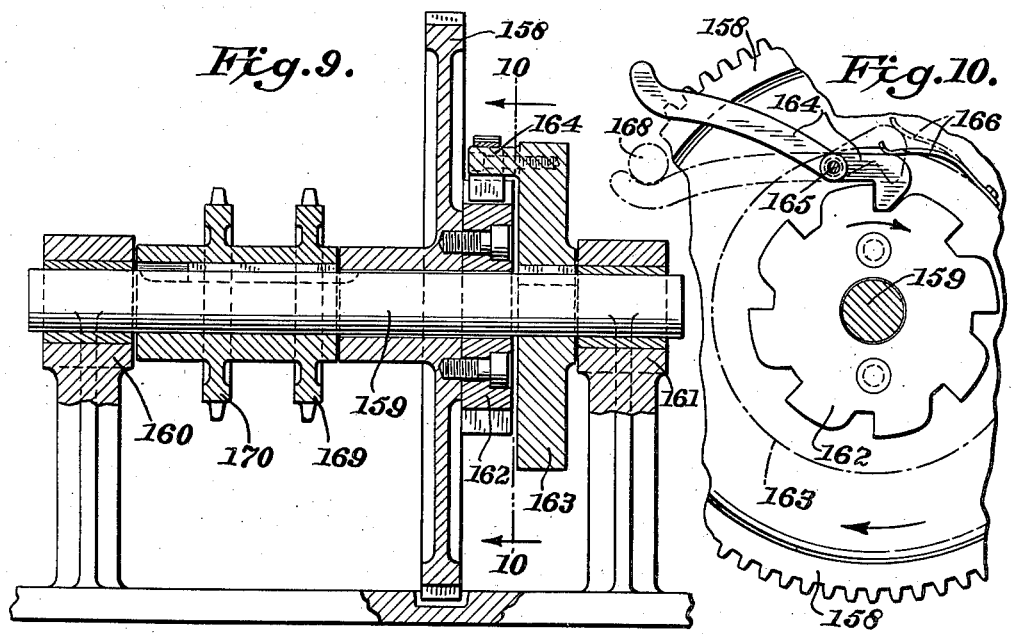
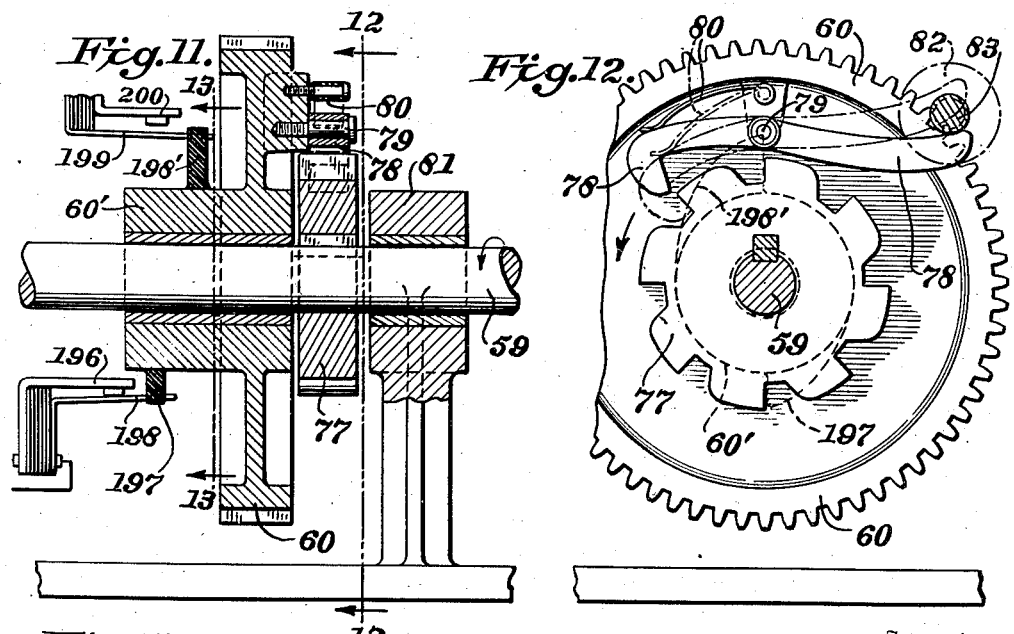
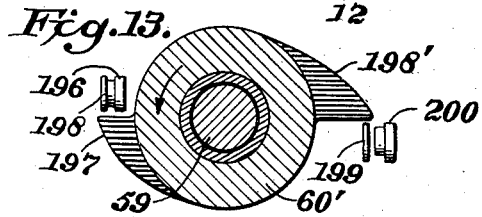

March 13, 1945. R. E. COSTA 2,371,128
ARTICLE HANDLING AND LEAKAGE TESTING APPARATUS
Filed Feb. 4, 1942 6 Sheets-Sheet 6
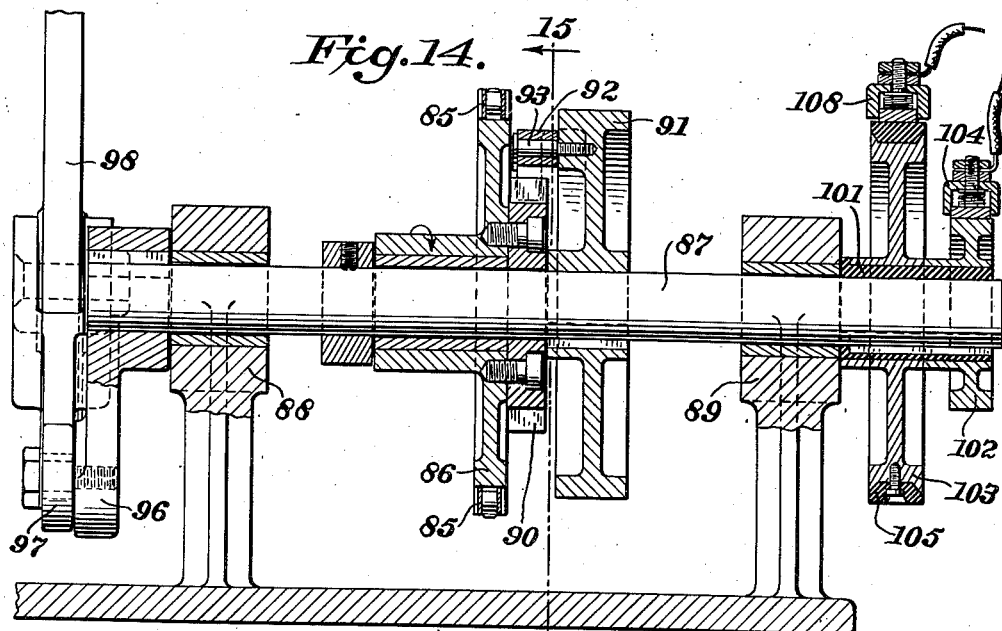
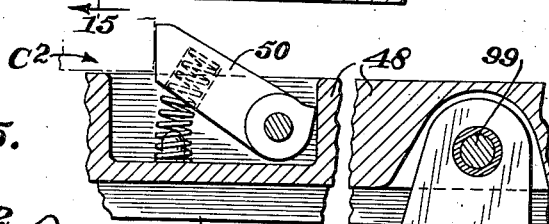
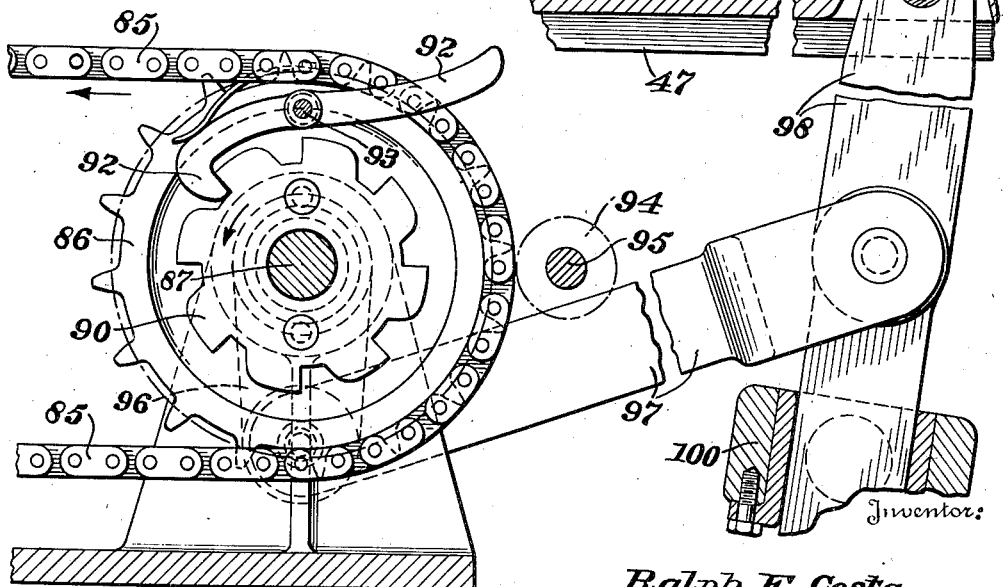
Inventor:
Ralph E. Costa,
By Cushman Darby Cushman
Attorneys.

Patented Mar. 13, 1945

2,371,128

UNITED STATES PATENT OFFICE 2,371,128

ARTICLE HANDLING AND LEAKAGE TESTING APPARATUS

Ralph E. Costa, Baltimore, Md., assignor to Crown Cork & Seal Company, Inc., Baltimore, Md., a corporation of New York Application February 4, 1942, Serial No. 429,551

11 Claims. (Cl. 73—40)

This invention relates to apparatus for transferring containers from one station to another and contemplates particularly such apparatus adapted to pick up a group of containers, as from a crate, and transfer them to a point of deposit preparatory to washing. More particularly the invention contemplates the use of a vacuum head as the transfer means, such a head being effective to pick up only the sound containers so that defective containers which will not hold vacuum are left behind for suitable disposal. In the use of the vacuum head, therefore, the apparatus serves as sorting means as well as transfer means.

In the accompanying drawings I have shown by way of illustration apparatus for carrying out the above mentioned and ancillary operations and the description will proceed with reference to these drawings in which:

Figure 1 is a plan view of the apparatus;

Figure 2 is a side elevation of the apparatus;

Figure 3 is a section generally on the line 3—3 of Figure 1;

Figure 4 shows a wiring diagram and associated instrumentalities;

Figure 5 is a section substantially on line 5—5 of Figure 1;

Figure 6 is a section substantially on line 6—6 of Figure 2;

Figure 7 is a partial sectional view considerably enlarged, partly substantially on line 3—3 of Figure 1 and in part, and on the same scale, substantially on line 7—7 of Figure 8;

Figure 8 is a plan view of valve mechanism which, on its section line 7—7, appears in Figure 7;

Figure 9 is an axial section, enlarged, of a jack shaft assembly which appears in plan in Figure 1;

Figure 10 is a section on line 10—10 of Figure 9;

Figure 11 is an axial section of certain drive mechanism;

Figure 12 is a section on line 12—12 of Figure 11;

Figure 13 is a section on line 13—13 of Figure 11;

Figure 14 is an axial section of further drive mechanism;

Figure 15 is a section substantially on line 15—15 of Figure 14, and

Figure 16 is an end elevation of the mechanism of Figure 14.

In the embodiment of the invention shown in the drawings, means are provided for the intermittent feed of crates filled with empty containers up to an unloading station and onto an elevator at that point. The elevator is then operated to lift the containers into the range of the vacuum head by which all sound containers are retained as the elevator lowers the crate and defective containers, if any. The thus emptied crate is then moved from the table and replaced by a succeeding full crate. During this interval the vacuum head is quickly moved to a position above an endless conveyor at the deposite station. As the head moves to a position over the conveyor the vacuum is broken and the containers are dropped and are carried by the conveyor to a chute which guides them to the washer. The head is then returned and the operation is repeated.

In Figures 1 and 2, reference numeral 25 designates an elongated table provided with side rails 26 and 27, the table being substantially continuous except where interrupted for the accommodation of the elevator 28. A foot shaft 29 journaled beneath the table has fixed thereon sprockets which drive endless chains 30 and 31 whose other end portions are engaged by head sprockets not shown. The top runs of chains 30 and 31 are received in longitudinal channels on the top of the table in the same manner as is shown in Figure 6 and are preferably equipped with free-running rollers. The crates, C1, C2, etc., filled with empty bottles, as here shown, are loaded onto chains 30 and 31 and are carried by the latter against spring projected stops 32 and 33 which are adapted to be retracted upon energization of solenoid coils 34 and 35. When the crates are stopped in this manner undue wear on the crate bottoms is avoided by the chain rollers, it being understood that the chains are continuously driven in the operation of the apparatus.

To the left of shaft 29 a head shaft 36 is journaled under the table and has fixed thereon sprockets which are engaged by endless chains 37 and 38 whose top runs lie in channels in the table top and whose ends are engaged by sprockets fixed on coaxial shafts 39 and 40. Shaft 40 has fixed thereon a sprocket 41 engaged by a drive chain 42. Head shaft 36 has fixed thereon a sprocket which is connected by a chain 43 with a larger sprocket fixed on shaft 29 for the drive of chains 30 and 31.

The elevator 28 includes a platform made up of two laterally spaced portions 44 and 45 which have generally flat supporting surfaces for the crates and may be provided with lateral guide rails as shown in Figure 3, these supporting surfaces in the rest position of the elevator being flush with the top surface of table 25. The latter has a central longitudinal depression 46 having a longitudinally slotted bottom wall 47 which serves as a guide for a slide 48 which is equipped with longitudinally spaced pivoted pawls 49 and 50 disposed in upwardly open pockets and normally upwardly spring pressed to a limit position in which their free ends project above the top of the slide, which is substantially flush with, or at least no higher than, the top surface of the elevator. Pawls 49 and 50, as appears most clearly in Figure 5, are spaced apart a distance somewhat greater than the length of a crate. As seen in Figure 1, the depression 46 extends somewhat to the right of shafts 39 and 40 and somewhat to the left of a head shaft 51 which has fixed thereon sprockets engaging endless chains 52 and 53 traveling in channels on the top of the table. Shaft 51 has fixed thereon a sprocket 54 which is continuously driven by a chain 55.

In Figures 1 and 2, a crate C' is on the elevator platform just in advance of pawl 49 and a crate C² is on table 25 just in advance of pawl 50. A crate C³ is engaged by stops 32 and 33 and is in turn engaged by a crate C⁴. Assuming that crate C' has just been unloaded, the slide 48 is moved to the left so that case C' is passed onto chains 52 and 53 to be carried away by the latter and crate C² is simultaneously brought onto the elevator platform. As the slide starts to move, solenoids 34 and 35 are energized so that stops 32 and 33 are withdrawn and chains 30 and 31 become effective to move crate C³ into engagement with chains 37 and 38, the latter traveling more rapidly than the former. This being the case crate C³ begins to move more rapidly than crate C⁴ and draws away from the latter to be moved to the position previously occupied by crate C², beyond the range of chains 37 and 38. Solenoids 34 and 35 are de-energized and the stops are spring-projected into the space between crates C³ and C⁴ so that the latter now occupies the position previously occupied by the former. Slide 48 is returned to the right, pawl 49 being depressed under crate C², now on the elevator platform, and pawl 50 being depressed under crate C³, and the two pawls rise behind the crates in propelling relation thereto.

It will thus be seen that chains 30 and 31 serve to advance the crates one by one to chains 37 and 38, the latter serving to move the received crate into position to be engaged by pawl 50. When the slide 48 is moved to the left the crate on the elevator platform is moved onto the chains 52 and 53 of the discharge conveyor, and the crate engaged by pawl 50 is moved onto the elevator platform.

Reference numeral 56 designates an electric motor whose armature shaft 57 drives into a speed reducer 58 whose output shaft is designated by the reference numeral 59. Fixed on this shaft are sprockets which respectively engage the drive chains 42 and 55. Free on shaft 59 is a gear 60, Figure 4, which engages a gear 61 fixed on a short shaft 62 supported in bearings 63 and 64. Fixed at the ends of shaft 62 are cranks 65 and 66 having coaxial pins to which are pivoted the lower ends of links 67 and 68 whose upper ends are pivoted coaxially beneath and to the elevator platform portions 44 and 45 respectively. Projecting rigidly downwardly from platform portion 44 is a pair of vertical rods 69 and 70 which are slidable in fixed socket members 71 and 72. Portion 45 is similarly vertically guided by rods 73 and 74 which cooperate with fixed socket members 75 and 76. The cranks 65 and 66 are shown in Figure 3 in rest position at the bottom of their throw, the links supporting portions 44 and 45 with their top surfaces flush with table 25.

Referring to Figures 11 and 12, reference numeral 77 designates a toothed disc fixed on shaft 59 and cooperable with a dog 78 pivoted at 79 on gear 60, a spring 80 tending to urge the head of the dog into the range of the teeth of disc 77. Mounted on a bearing 81 adjacent disc 77 is a solenoid 82 including a core 83 normally spring-projected into the path of rotation of the tail of dog 78. Momentary energization of the solenoid coil retracts the core, enabling spring 80 to force the head of the dog into engagement with a tooth of disc 77 so that the latter will drive gear 60 through exactly one revolution as determined by the reengagement of the dog by core 83, thus causing its disengagement from disc 77. Consequently, whenever solenoid 82 is energized the cranks 65 and 66 will make one revolution thus lifting and returning the elevator platform. It will be understood that upon the momentary retraction of core 83 spring 80 will move the dog 78 to the dotted line position of Figure 12, the tail coming in front of the core and the latter returning to blocking position after the tail has traveled out of the way.

While the elevator is in its lower position, it is necessary to reciprocate slide 48 and to energize solenods 34 and 35. Suitable means for carrying out these operations will now be described.

Referring more particularly to Figures 2, 4, 5, 14 and 15, reference numeral 84 designates a sprocket wheel fixed on shaft 59 and, through a chain 85, driving an equal sprocket wheel 86 which is mounted on a horizontal shaft 87 extending transversely beneath the table and supported in bearings 88 and 89. Fixed against wheel 86 is a toothed disc 90 and immediately adjacent the latter a disc 91 is fixed on shaft 87 and carries a dog 92, pivoted at 93, which is cooperable with the toothed disc 90. A normally de-energized solenoid 94 includes a core 95 ordinarily spring-projected into the path of the tail of dog 92 so that the dog is normally in an inoperative relation such as is shown in Figure 12. Upon energization of the solenoid 94, however, the core 95 is momentarily retracted so that the dog 92 becomes engaged with disc 90 and one revolution is imparted to shaft 87.

Fixed on one end of the shaft 87 is a crank 96 to which is pivoted one end of a link 97 whose other end is pivoted to an arm 98. The upper end of arm 98 projects through the slot of the bottom wall 47 and is pivoted on a transverse horizontal axis at 99, Figure 15, to the slide 48. The lower end of the arm is slidable in a rocker bearing 100. In the normal position of the parts, the crank arm extends horizontally to the right so that the slide 48 is in the extreme right hand position particularly shown in Figure 5 wherein pawl 49 is behind the crate on the elevator and pawl 50 is behind the succeeding crate. When shaft 87 is now driven through one revolution, the crank will pull the slide 48 to the left so that the crate on the elevator is passed to the discharge conveyor chains 52 and 53 and the succeeding crate is brought onto the elevator, the slide being then returned to the position of Figure 5.

Keyed on the opposite end of shaft 87 from crank 96 through the intermediary of an insulating bushing 101 are metal discs 102 and 103 whose hub portions are integrally connected together. A brush 104 constantly contacts the periphery of disc 102. Disc 103 has a tire 105 of insulating material into which is set a metal segment 106 which is in electrical connection with the disc through the securing screws 107 as particularly shown in Figure 16. A brush 108 engages the tire 105 and segment 106 and when in contact with the latter establishes a connection with brush 104 so that an energizing circuit 109 for the windings of solenoids 34 and 35 is completed and their cores are retracted to release the previously restrained crate. Segment 106 comes into contact with brush 108 as soon as shaft 87 starts to rotate to actuate slide 48. The segment is of such length that as soon as the crate $C^3$, Figure 1, has been propelled beyond the stops by conveyor chains 37 and 38, circuit 109 will be broken and the stops will be projected into the space between crates $C^3$ and $C^4$, it being remembered that such a space exists by reason of the fact that conveyor chains 37 and 38 have a greater accelerative action than chains 30 and 31.

I shall now describe the means whereby the containers are transferred from a crate on the elevator to the deposit station and are passed from the latter to the washer.

In Figures 1 and 3 reference numerals 110 and 111 designate upright frames on which are mounted bearings for two horizontal, parallel, double threaded shafts 112 and 113. Reference numeral 114 designates generally a suction head supported on shafts 112 and 113 and reciprocable along the latter by reason of the provision on the head of reversing nuts 115 and 116 which cooperate with the shaft threads.

The crates herein contemplated are, in the usual manner, provided with partitions defining separate compartments for the containers and by reason of which the containers are substantially regularly positioned as a group. As shown in Figure 1 the crate $C^2$ carries twenty-four containers which are aligned longitudinally and transversely of the crate. Under these circumstances the suction head 114 is provided at its underside with twenty-four suction ports whose arrangement corresponds with that of the containers in the crate so that with the head in position above the elevator, at one extremity of its travel on shafts 112 and 113, the containers in an elevated crate will each be placed in communication with a suction port so that when the elevator lowers the crate all sound containers will be retained by the head.

In Figures 1, 2 and 3, reference numeral 117 designates a motor and vacuum pump unit connected by a conduit 118, Figure 7, into a passage 119 of a valve body 120 forming a part of the head. The passage 119 terminates in a conical seat in which is disposed a valve plug 121 on a vertical axis, the plug being provided at its upper end with a horizontally projecting operating arm 122 normally held in the full line position of Figure 8 by a spring 123. The plug is provided with a lateral recess 124 which in the normal position of the plug connects passage 119 with a passage 125 which is in connection with a manifold 126 of the head, so that with the unit 117 in operation a vacuum condition can be created in the head. If arm 122 is swung in a clockwise direction to the dotted line position of Figure 8, the pump connection will be cut out and recess 124 will place the passage 125 in connection with the atmosphere through a passage 127 so that the head vacuum will be broken.

The flat bottom wall 128 of the head is provided with twenty-four vertical bores 129 positioned as the containers in the crate. Each bore 129 is surmounted by an enlarged bore 130 in which is set the lower end of a sleeve 131 whose upper portion is disposed in a chamber 132 forming a part of the manifold. Within the chamber 132 sleeve 131 is provided with openings 133 which communicate with an inner annular groove 134. Slidable in bore 129 and sleeve 131 is a tubular valve member or stem 135 to which is secured an inverted cup 136 in which is fixed a pad 137 of material suitable for forming a seal with the open end of a container, for example the bottle 138, Figure 7. The cup 136 is received and guided in a cylindrical bore 139 of a shoe 140 and is normally urged against an annular shoulder 141 by an expansion spring 142 in sleeve 131. Under these circumstances side openings 143 of the tube of stem 135 lie below the annular groove 134 and the latter is sealed by solid wall portions of the tube. Shoe 140 includes a downwardly projecting annular flange or cup portion 144 which defines a downwardly flared guide opening 145 whereby the top of a container 138 may be guided to a centered position with respect to tube 135, and against pad 137.

With the head 114 above a crate of containers on the elevator, upward movement of the latter will bring the upper ends of the containers into the guide openings 145 and upon engagement of the container ends with the pads 137 the latter and their associated tubes 135 will be lifted. The range of upward movement is such that it continues slightly after the cups 136 have abutted the bottom of wall 128 so that the container lips will be sure to be thoroughly engaged with the sealing pads. Upward movement of the tubes 135 has brought their openings 143 into communication with grooves 134 and, consequently, with the vacuum pump, so that the containers are instantaneously exhausted through the ports defined by the tubes. The tubes constitute parts of valves whose other parts are constituted by the sleeves in which the tubes slide. As the elevator moves downwardly with the crate all of the sound containers will be retained against the sealing pads and the latter will be retained in their upper limit position so that connection of the pump with the containers is maintained. Any unsound container will lower away with the crate and the tube 135 previously upwardly displaced thereby will lower under the action of its associated spring 142 so that the respective groove 134 is closed and loss of vacuum prevented.

Shafts 112 and 113 now act to move the head to the deposit station and as the head moves into this position arm 122 strikes a projection 146 on frame 111, Figures 1 and 3, so that arm 122 is moved to the dotted line position of Figure 8 to connect the head manifold with atmosphere so that the containers are dropped and the tubes 135 returned to their lower position. The head immediately starts its return movement and valve 121 is returned to normal position by spring 123.

The released containers, Figures 2 and 3, are received on the upper run of an endless conveyor belt 147 associated with end rolls 148 and 149 which are mounted on shafts journaled in bearings on frame 111 and on an auxiliary frame 150. The top of belt 147 is sufficiently below head 114 so that the containers can drop clear of the flanges 144. The shaft 151 of roll 147 has fixed thereon a sprocket 152 which, through a chain 153, is driven from a sprocket 154 fixed on the reducer out-put shaft 59. The containers deposited on belt 147 are moved by the latter into a chute 155 which guides the containers to any desired destination such as the washer 156, Figure 1.

A pinion 157 on motor shaft 57 drives a gear 158 which is free on a shaft 159, Figure 9, whose ends are journaled in bearings 160 and 161. A toothed disc 162 is fixed against gear 158 and immediately adjacent disc 162 a disc 163 is fixed on shaft 159 and carries a dog 164 on a pivot pin 165, Figure 10, the head of the dog being urged toward engagement with disc 162 by means of a spring 166. A solenoid 167 supported on an arm extending from bearing 161, Figure 4, includes a core 168 normally spring retracted out of the range of the tail of dog 164. Consequently dog 164 is normally engaged with disc 162 so that shaft 159 is driven. Upon energization of solenoid 167 the core 168 is projected into the path of the tail of dog 164 so that the dog is moved to the disengaged position indicated in dotted lines in Figure 10 and drive to shaft 159 is arrested, but is immediately resumed upon de-energization of solenoid 167. Fixed on shaft 159 is a pair of equal sprockets 169 and 170 which through chains 171 and 172 drive equal sprockets 173 and 174 fixed on shafts 112 and 113 respectively.

Through means which will now be described solenoid 167 will be energized when head 114 moves into crate unloading position above the elevator 28 and will be maintained energized during the lifting and lowering movement of the elevator, thus assuring that the crate will be free of the containers retained by the head before the latter begins to move toward the deposit station. When the elevator has returned to its lower position the de-energization of solenoid 167 again places gear 158 in driving connection with shaft 159 and shafts 112 and 113 will be continuously driven to move the head to the deposit station and return it. The nuts 115 and 116 reverse at each limit of travel of the head in known manner.

Pivoted on head 114 on a vertical axis 175 is a dog 176 which is urged by a spring 177 in counterclockwise direction against a stop 178, Figure 1. Pivoted on a vertical axis 179 on a bracket 180 projecting from the top of frame 110 is a member or block 181 having a cam surface 182 in the path of movement of dog 176. Member 181 is urged in a clockwise direction against a stop 183 by a spring 184. Fixed to block 181 is a longitudinally projecting rod 185 having an insulated tip 186. A switch 187, see also Figure 4, comprises insulated spring arms 188 and 189, the former having a transversely inclined end portion 190.

As head 114 moves toward its unloading position dog 176 strikes the cam surface 182 and swings block 181 in a counter-clockwise direction. This causes the insulated tip 186 to engage the undersurface of portion 190 so that arm 188 is sprung somewhat away from arm 189 and then returns to original position as tip 186 passes beyond portion 190. As head 114 reaches registering position with the crate on the elevator, dog 176 leaves block 181 and the latter is returned to the position shown in Figure 1. Tip 186 engages the top of portion 190 during return of block 181 so that arm 188 is cammed downwardly into contact with arm 189.

When switch 187 is thus momentarily closed, a relay 191 is energized and its contactors 192 and 193 establish, respectively, an energizing circuit 194 for solenoid 167 and a holding circuit 195 for the relay, this holding circuit including a normally closed switch 196, Figures 4, 11 and 13. As gear 60, which it will be recalled drives the elevator, nears the completion of its one revolution, an insulated cam projection 197 on the hub 60' thereof engages arm 198 of switch 196 so that the latter is opened and relay 191 de-energized. Consequently, contactors 192 and 193 move to the open position shown in Figure 4. This movement of contactor 192 breaks the circuit to solenoid 167 so that its core 168 is immediately spring retracted out of the range of dog 164 and consequently drive of shafts 112 and 113 is resumed. Switch 196 again closes as gear 60 reaches the normal rest position indicated in Figure 13. Just prior to this, a second insulated cam projection 198' on the hub 60' has engaged the arm 199 of a normally open switch 200 and has closed the switch momentarily to complete a circuit 201 for solenoid 94 so that the core of the latter is retracted and shaft 87 is driven through one revolution to operate slide 48 and the solenoid stops 34 and 35 in the manner heretofore described. As head 114 moves away from crate unloading position, dog 176 is tripped by block 181 and the latter remains in normal position so that switch 187 is not affected.

It may be unnecessary in some cases to provide for a dwell in the travel of the suction head at crate unloading position. However, such a dwell is necessary when the crates are of substantial depth, as shown, in order that the head will not begin to move before the crate has been lowered below the container bottoms. In the described arrangement the suction head has a dwell substantially throughout the reciprocating period of the elevator. Obviously, this dwell period can be shortened as desired by appropriately positioning the projection 197 on hub 60'. It will be noted from Figure 11, that the projections 197 and 198' are axially spaced and that the radial extent of projection 197 is sufficiently small so that there will be no interference with switch 200. Switch 200 is closed slightly before the elevator is completely down, but the elevator will have reached its lower limit before crate C², Figure 1, reaches it. To prevent any possibility of a jam, the receiving edge of the elevator can be beveled off somewhat.

While I have illustrated a system which includes means for receiving crates of empty containers and transferring the containers to a washer, it will be understood that the invention is not necessarily limited to embodiment in such a system, nor to the use of the particular mechanical means which have been described by way of illustration. The invention is susceptible of variation in the form and arrangement of parts and consequently I do not limit myself in these respects except as in the following claims.

I claim:

1. Apparatus for handling groups of containers, comprising means for supporting a group of open-ended containers open end up, a suction head movable between a position above a group of containers on the supporting means and a position of deposit, said head having on its underside a group of suction ports corresponding in disposition with the containers of said group so as to substantially register with the latter when the head is in its first-named position, sealing means surrounding said ports, operating means for vertically relatively approaching said supporting means and head when the head is in said first-named position whereby to contact said sealing means and container ends and place said ports in communication with the containers respectively, independent normally closed valves for the head ports opened as a result of the relative approach of the head and supporting means so that the sound ones of the containers are held to the head by vacuum, said operating means then acting to move the head and supporting means apart permitting any valve associated with a port in communication with an unsound container to close, means for then moving the head and held containers to the position of deposit, and means operative to break the vacuum and release the containers when the head is in its last-named position, the head moving means then acting to return the head.

2. Apparatus for handling groups of containers, comprising means for supporting a group of open-ended containers open end up, a suction head, means for moving said head between a position above a group of containers on the supporting means and a position of deposit, said head having on its underside a group of suction ports corresponding in disposition with the containers of said group so as to substantially register with the latter when the head is in its first-named position, a suction manifold in said head in communication with said ports, a control valve for said manifold having a position in which it connects the manifold with a source of vacuum and a position in which it breaks the vacuum, sealing means surrounding said ports, means for vertically reciprocating said supporting means whereby in its upward movement, with the head in said first-named position, the containers are engaged with said sealing means and placed in communication with said ports respectively, independent self-closing valves associated with said ports respectively opened as a result of the engagement of the containers by said sealing means so that sound ones of the containers are held to the head by vacuum as the supporting means is lowered whereas any valve associated with a sealing means engaging an unsound container closes as the unsound container is left behind, and means effective to operate said control valve to vacuum breaking position when the head has moved to the position of deposit.

3. Apparatus of the class described comprising a support, means automatically operated for intermittently moving crates of upwardly open containers onto said support, a suction head above the support, means for moving said head and support together and apart, said suction head being operative to simultaneously vacuumize the sound containers in a crate on said support when the latter and the head are moved together and to retain said containers when the head and support are moved apart, means for moving the head and retained containers to a point of deposit and to return the head, means for breaking the vacuum at said point, and means timedly related to the first-named moving means for moving the emptied crates from the support.

4. Apparatus of the class described, comprising a support, means for successively moving crates of upwardly open containers across said support with a dwell on the latter, a suction head, means for moving said head between a position above said support and a position of deposit with a dwell at the first-named position, means for moving said head and support together and apart during said dwells whereby upon movement together the head is effective to engage and vacuumize sound ones of the containers in the crate and to retain them upon movement apart, and means for breaking the vacuum at the position of deposit.

5. Apparatus of the class described, comprising a support, means for successively moving crates of upwardly open containers onto said support, a suction head, means for moving said head horizontally between a position above a crate of containers on the support and a position of deposit with a dwell in the first-named position, said head having on its underside a group of suction ports corresponding in disposition with the containers in the crate so as to substantially register with the latter when the head is in said first-named position, sealing means surrounding said ports, means for vertically reciprocating said support whereby in its upward movement during said dwell the containers are engaged with said sealing means and placed in communication with said ports respectively so that sound ones of the containers are held to the head by vacuum as the support is lowered, and means operative to break the vacuum at the end of the horizontal movement of the head to the position of deposit.

6. Apparatus for handling groups of containers, comprising means for supporting a group of open-ended containers open end up, a suction head, means for driving said head horizontally back and forth between a position above a group of containers on the supporting means and a position of deposit, means for interrupting the drive momentarily when said head is in the first-mentioned position, means for intermittently raising and lowering the supporting means so that during said drive interruption the containers are lifted into engagement with said head and sound ones of the latter are retained by said head, and means for releasing the containers from the head at the end of its horizontal movement to the position of deposit.

7. In apparatus of the class described, a suction head defining a suction manifold, said head having bottom openings, downwardly projecting tubular members slidable in said openings between upper and lower positions, said members constituting portions of valves which are closed when said members are in normal lower position and opened when said members are moved to upper position, and sealing pads fixed on the lower portions of said members.

8. Apparatus according to claim 7 wherein a control valve is provided on said head, said valve having a position in which it connects the manifold with a source of vacuum and a position in which it cuts out the source and connects the manifold with the atmosphere.

9. Apparatus for handling groups of containers, comprising means for supporting a group of open-ended containers open end up, a suction head movable between a position above a group of containers on the supporting means and a position of deposit, said head having on its underside a group of suction ports corresponding in disposition with the containers of said group so as to substantially register with the latter when the head is in its first-named position, sealing means surrounding said ports, operating means for vertically relatively approaching said supporting means and head when the head is in said first-named position whereby to contact said sealing means and container ends and place said ports in communication with the containers respectively, tubes carried by said head defining said ports and vertically slidable between upper and lower positions, said tubes carrying said sealing means and constituting parts of independent valves which are closed when the tubes are in said lower position and are opened as a result of upward displacement of the tubes upon contact of their associated sealing means with the containers during relative approach of the head and supporting means so that sound ones of the containers are held to the head by vacuum, said operating means then acting to move the head and supporting means apart permitting any tube whose associated sealing means is in contact with an unsound container to return to lower position, means for then moving the head and held containers to the position of deposit, and means operative to break the vacuum and release the containers when the head is in its last-named position, the head moving means then acting to return the head.

10. Apparatus for handling containers, comprising means for supporting a group of open-ended containers open end up, transfer means comprising a suction head movable between a position above a group of containers on said supporting means and a position of deposit, said head having on its underside a group of suction ports corresponding in disposition with the containers of said group so as to substantially register with the latter when the head is in its first-named position, yieldingly mounted sealing means surrounding said ports respectively, means for vertically relatively approaching said supporting means and head when the head is in said first-named position whereby to contact said sealing means and container ends and place said ports in communication with the containers respectively, said relative approach having an extent such that it continues a short distance after said contact has occurred whereby to cause the yielding of said sealing means, independent normally closed valve means for said ports opened as the result of such yielding so that sound ones of the containers are held to the head by vacuum, said operating means then acting to move the head and supporting means apart with the result that any sealing means engaged by an unsound container returns to normal relation and thus closes its associated valve, means thereupon operative to move the head and held containers to the position of deposit, and means operative to break the vacuum and release the containers when the head is in its last-named position, the head moving means then acting to return the head.

11. Apparatus of the class described, comprising an elevator adapted to support a crate containing a group of upwardly open containers, means for lifting and lowering the elevator, conveyor means associated with said elevator, means for driving said conveyor means to intermittently move a crate from said elevator and to move another crate thereon when the elevator is in its lower position, a transfer head movable between a position above said elevator and a position of deposit, means for driving said head between said positions with a dwell at the first-named position during the lifting of said elevator, means whereby said head engages the containers upon lifting of the elevator and retains sound ones of the containers upon lowering of the elevator, and means causing the release of the retained containers at the position of deposit.

RALPH E. COSTA.